Aug. 6, 1968    L. A. GREENBERG ET AL    3,395,664
TETRAHEDRON SAILING VEHICLE

Filed Sept. 12, 1966    4 Sheets-Sheet 1

INVENTORS
LEWIS ANTHONY GREENBERG
ELLIS D. GELMAN
EUGENE P. FLORES
ENA M. DUBNOFF

By H. Michael Bruckner

INVENTORS
LEWIS ANTHONY GREENBERG
ELLIS D. GELMAN
EUGENE P. FLORES
ENA M. DUBNOFF

Aug. 6, 1968     L. A. GREENBERG ET AL     3,395,664
TETRAHEDRON SAILING VEHICLE

Filed Sept. 12, 1966     4 Sheets-Sheet 3

INVENTORS
LEWIS ANTHONY GREENBERG
ELLIS D. GELMAN
EUGENE P. FLORES
ENA M. DUBNOFF

Aug. 6, 1968  L. A. GREENBERG ET AL  3,395,664
TETRAHEDRON SAILING VEHICLE

Filed Sept. 12, 1966  4 Sheets-Sheet 4

INVENTORS
LEWIS ANTHONY GREENBERG
ELLIS D. GELMAN
EUGENE P. FLORES
ENA M. DUBNOFF though not shown in FIG. 1 the forward stabilizing fin may also be pivotal to aid in steering.

United States Patent Office 3,395,664
Patented Aug. 6, 1968

3,395,664
TETRAHEDRON SAILING VEHICLE
Lewis Anthony Greenberg and Ellis D. Gelman, both of 3607 Pacific Ave., Venice, Calif. 90291; Eugene P. Flores, 327 South Ave. 56, Los Angeles, Calif. 90001; and Ena M. Dulnoff, 1150 La Loma Road, Pasadena, Calif. 91105
Filed Sept. 12, 1966, Ser. No. 578,825
16 Claims. (Cl. 114—39)

ABSTRACT OF THE DISCLOSURE

A wind-propelled vehicle having a tetrahedronal frame defining a triangular base, a sail supported by the frame, and means mounted to the frame at the corners of the triangular base for engaging and supporting the vehicle for motion relative to a traveled surface.

---

The present invention relates to sailing vehicles and more particularly to sailing vehicles having a plurality of surface engaging means.

The present invention teaches a sailing vehicle which is capable of operating in water, on land or on ice depending on the particular surface engaging means with which the vehicle is equipped. A novel frame structure together with the proper placement of surface engaging means provides the present invention with outstanding operating characteristics for any of the surfaces mentioned above. The advantages which accrue to the present invention are derived primarily from a frame structure which is novel to vehicles and which gives a vehicle exceptional structural rigidity.

In the case of vehicles which operate in water (boats), it is known that a relationship exists between the wetted surface of the vehicle's hull, or hulls, and the maximum possible speed of the vehicle: the hull speed. While the hull speed of a boat having a single hull can be fairly accurately predicted by the use of known mathematical formulas, the hull speed of multi-hull vessels is obtainable only empirically. It is known, however, that where the boat speed is the operating characteristic to be optimized, multi-hull vessels produce the best results. Because of the fact that multi-hull vessels do not lend themselves to design by the use of mathematical formulas, a wide variety of catamaran and trimaran designs have been built; some of which have attained rather astonishing hull speeds—up to 22 knots.

While multi-hull boats are capable of high speeds, these speeds have been attained at the cost of other operating characteristics such as maneuverability. It is well known that catamarans and trimarans are very difficult to turn into the wind, thus making them difficult to operate and thus undesirable to the casual sailor.

In additon to the maneuverability problems inherent in presently known multi-hull boats, there are also problems in keeping such boats intact in unfavorable weather conditions where large forces are experienced by the boat's frame.

Accordingly it is an object of the present invention to provide a wind driven vehicle which is extremely stable during operation, yet easily maneuvered and capable of withstanding greater structural forces during operation than similar vehicles now known to the art.

Another object of the present invention is to provide a multi-hull sailing vessel which has an exceptionally small wetted surface, thus giving it a potentially high hull speed, and at the same time has the characteristics of being capable of being easily maneuvered into the wind and outstanding structural rigidity.

Further and more specific objects and advantages of the present invention will be made apparent in the following description wherein a preferred embodiment of the invention is described with reference to the following drawings.

Figure 1:
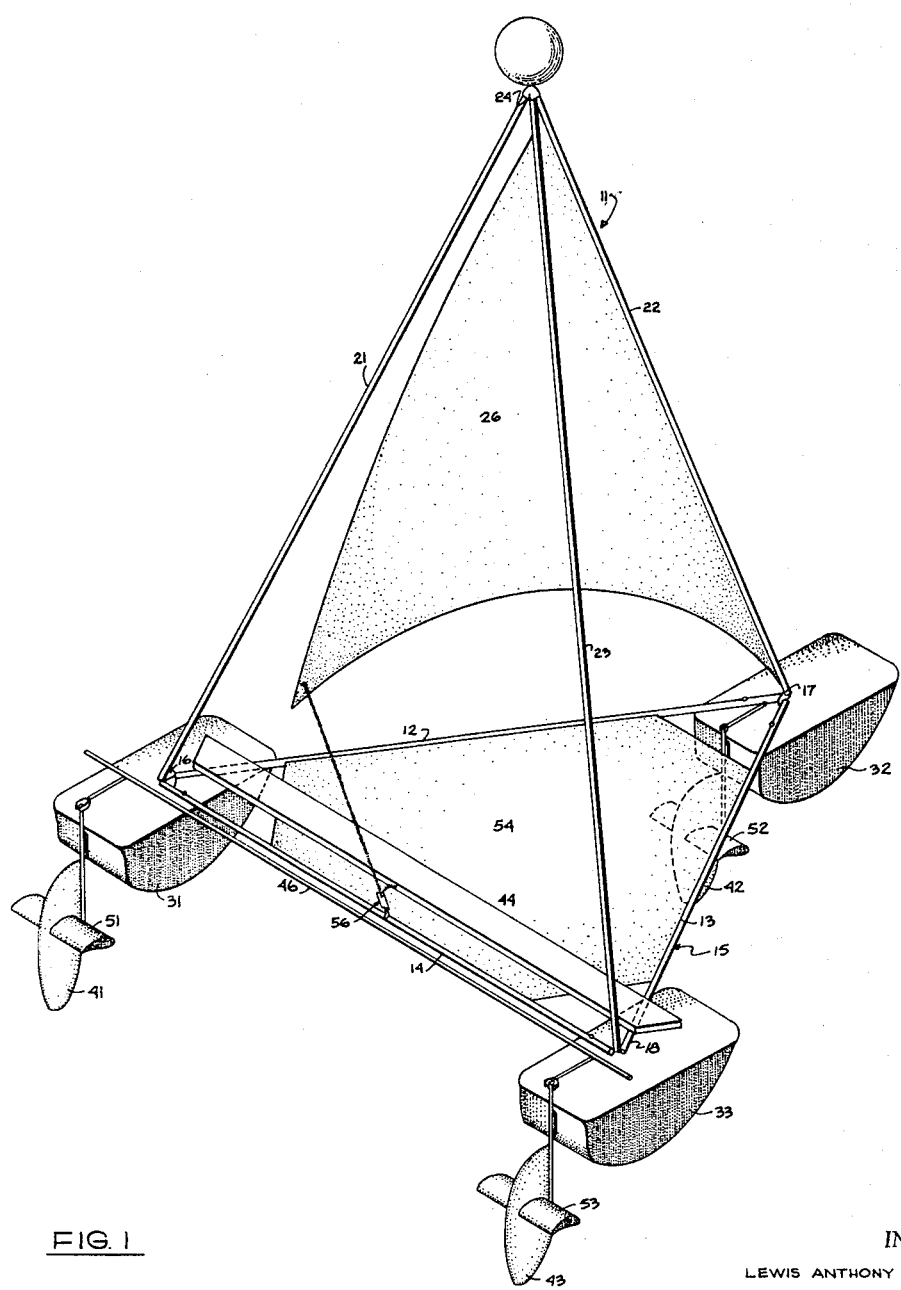
FIG. 1 is an isometric illustration of the vehicle of the present invention equipped to operate in water.

Referring now to FIG. 1, a vehicle as taught by the present invention equipped for operating in water includes a frame 11 formed from a plurality of tubular members joined to define the edges of a tetrahedron. Tubular members 12, 13 and 14 are joined at their ends by brackets 16, 17 and 18 to form the triangular base 15 of the tetrahedron frame 11 while tubular members 21, 22 and 23 form the upstanding portion. A bracket 24 connects each of the members 21, 22 and 23 at the apex of the tetrahedron while the other ends of the members are joined at brackets 16, 17 and 18, respectively.

By using aluminum tubing for the frame forming members 11, 12, 13, 21, 22 and 23, it is possible to construct a frame which is extremely light in weight but at the same time exceptionally rigid.

A sail 26 is secured to the upstanding frame member 22 whereby the vehicle is capable of being propelled by the wind. In this embodiment of the invention the mast is an integral part of the vehicle frame structure whereby the extra weight of a separate mast is avoided.

Buoyant members 31, 32 and 33 are secured at each corner of the triangular base 15 by appropriate means such as brackets 16, 17 and 18, respectively. Buoyant members 31, 32 and 33 are preferably formed to have hull configurations which cause them to plane when the vehicle passes through the water at a particular speed. Thus, as the vehicle passes the speed at which the hulls begin to plane, the wetted surface of the boat is reduced even further whereby additional increases in speed become possible.

Figure 4:
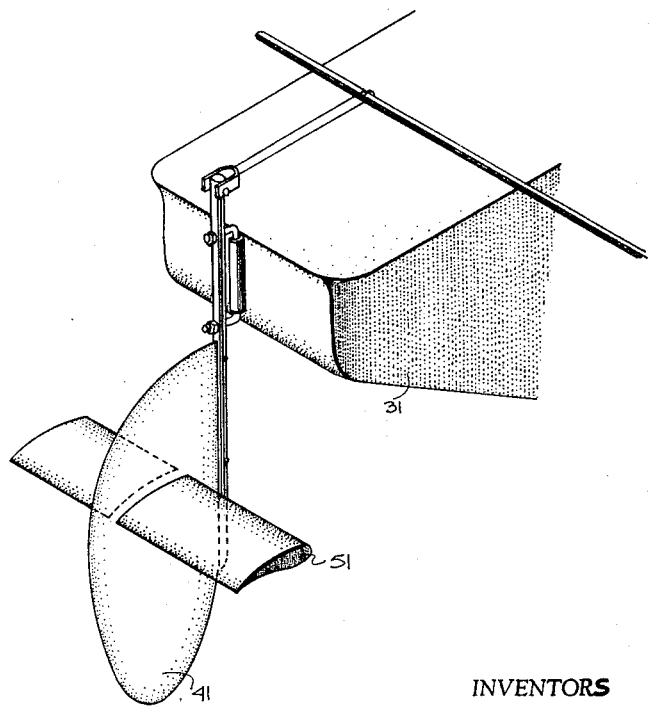
FIG. 4 is an enlarged view of the rudder structure of the invention showing the manner in which it is secured to the vehicle.

In order to give the vehicle stability in the water, stabilizing fins 41, 42 and 43 are associated with each of the buoyant members 31, 32 and 33, respectively. As best seen in FIG. 4, the rear stabilizing fins are pivotally secured to their associaed buoyant members, whereby they serve to steer the vehicle as well as stabilize it. A seat 44 is connected at its ends to the base forming members 12 and 13 and disposed parallel to the base forming member 14 in close proximity thereto. By having the seat 44 span the entire width of the vehicle, it is possible for a person sailing the boat to shift his weight to counterbalance the tendency of the vehicle to tip under heavy wind conditions. A steering bar 46 is disposed parallel to seat 44 and is conneced to the two pivotally mounted stabilizing fins 41 and 43 whereby it is possible to change the position of both fins from any position on the seat 44 and thereby navigate the boat.

While the stabilizing fin 42 is shown as being non-pivotally secured to its associated buoyant member, it is within the teaching of the present invention to also pivotally mount fin 42 to add further steering means.

The tetrahedron frame structure 11 gives the vehicle extremely advantageous strength characteristics, and the spaced apart flotation members 31, 32 and 33 give the vehicle an extremely small wetted hull surface relative to the overall length and width of the vehicle. The fact that the stabilizing fins 41 and 43 also operate as rudders gives the vehicle the added advantages of being able to easily turn into the wind as compared to multi-hull boats wherein the fixed stabilizing fin members resist such movement.

Because of the fact that the unique design of the present invention gives it the capability of exceptionally high speed, in spite of the fact that it is a wind driven vehicle, it is possible to raise the vessel out of the water and operate it on hydro-foils such as foils 51, 52 and 53 secured to fins 41, 42 and 43, respectively.

In order to make it possible to reach the front buoyant member 32 during operation of the vehicle, a web 54 is disposed within the area enclosed by the triangular base 15. The web 54 is capable of supporting at least one person and is necessarily porous to allow for the drain of water which will unavoidably fall on it. The sail rigging shown generally at 56 is of standard design and forms no part of the invention.

In addition to the outstanding sailing characteristics of the above-described vehicle, its unique design also has the inherent advantage of making it readily transportable in a package of small size compared to the overall size of the assembled vehicle. By having the members 21, 22 and 23 removably pinned to the brackets 16, 17 and 18, it is possible to detach the entire upper tetrahedron structure and by further providing the bracket 24 with pivotal connections, the members 21, 22 and 23 can be disposed parallel to one another without separating them. By further providing brackets 16, 17 and 18 which are easily removable from the buoyant members 31, 32 and 33, it is possible to transport the three flotation members in a compact form since they can then be placed side by side. It follows that the stabilizing fins are also easily demounted from the buoyant members whereby in a matter of minutes the entire vehicle can be disassembled into several separate parts each of which is advantageously packaged for transport as on the top of an automobile. When it is considered that it is contemplated that the vehicle of FIG. 1 have a beam of 12 feet or more and a length of similar dimension, the ability to carry the vehicle on the top of an automobile gives it a great deal of appeal to the casual sailor.

Figure 2:
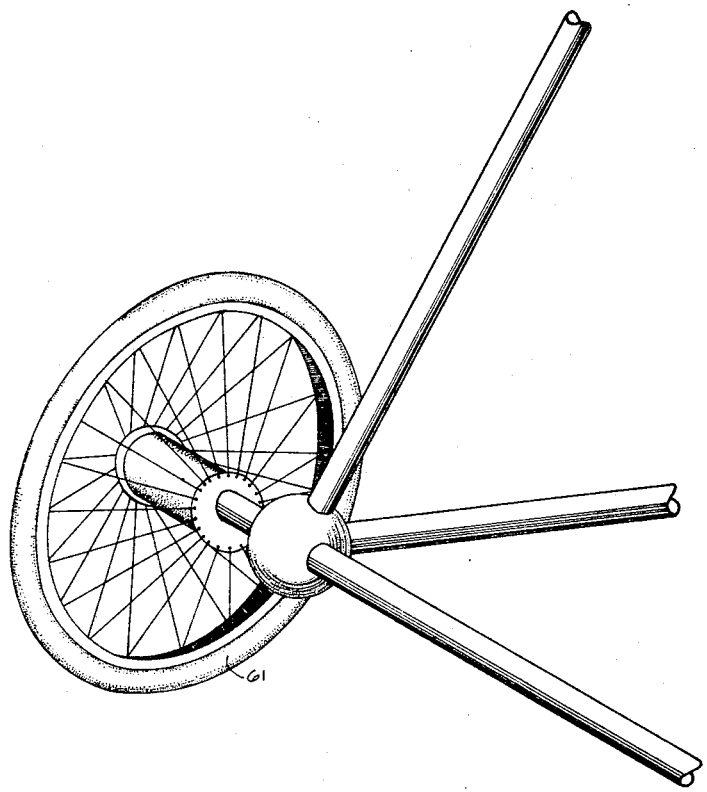
FIG. 2 is an isometric illustration of a portion of the vehicle of the present invention equipped with land engaging means.
Figure 3:
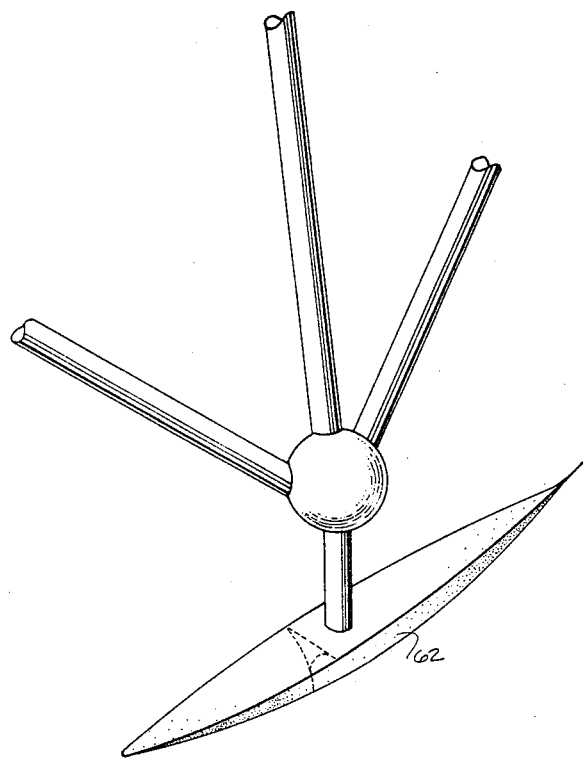
FIG. 3 is an isometric illustration of a portion of the invention equipped with a skate for operation on ice.

Referring now to FIG. 2, a wheel 61 (e.g. a bicycle wheel) is secured at each corner (only one of which is shown) of base 15 whereby the vehicle is capable of being operated on land. Since the rest of the vehicle is substantially identical with that described above with reference to FIG. 1, many of the aforementioned outstanding operating characteristics and structural advantages are also obtained. Similarly, as shown in FIG. 3, a skate 62 can be used as the surface engaging means where it is desired to operate the vehicle over ice.

In all of the vehicles taught by the present invention, the tetrahedron frame structure is maintained whereby each of the vehicles has the necessary rigidity and strength to operate at high speeds and withstand the forces experienced by a vehicle at such speeds. In the case of a land vehicle or ice vehicle, it is to be noted that a driver by securing himself to the seat as by a seat belt is protected at all times since even if the vehicle should roll it is not possible for the driver to be thrown to the operating surface as he is within the frame in all orientations thereof.

Figure 5:
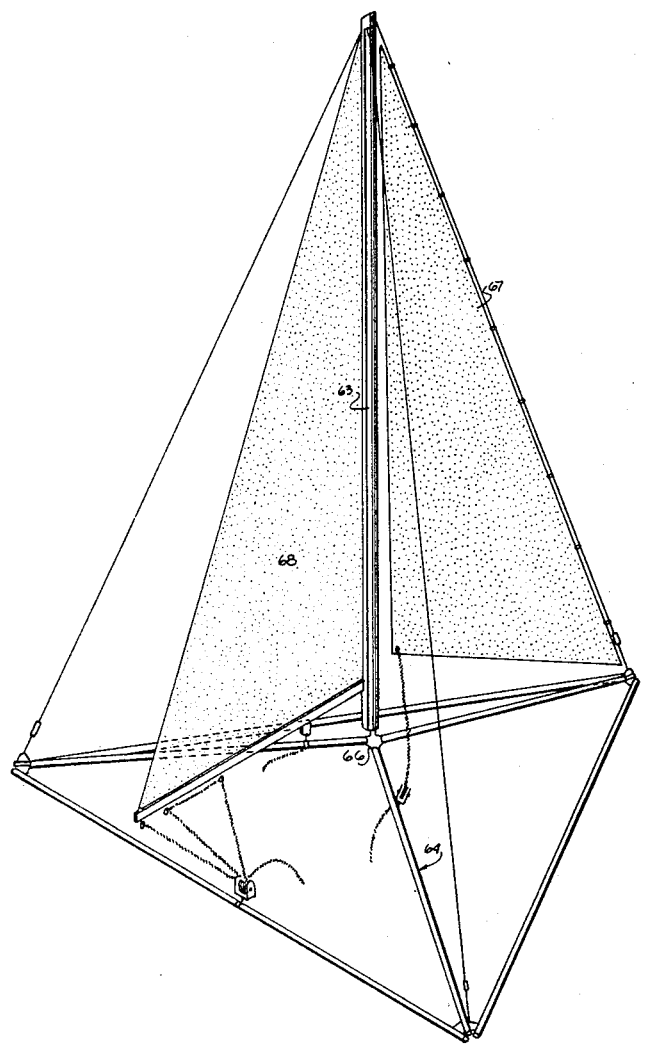
FIG. 5 is an isometric illustration of an alternate embodiment of the present invention wherein the mast is not one of the frame members.

Referring now to FIG. 5, an alternate embodiment of the invention (the surface engaging means are deleted since they may be any one of the three means described above) includes a tetrahedron frame structure 64 which supports a mast 63 which is not a part of the frame. The mast 63 is supported by the tetrahedron frame structure 64 by securing the mast to the apex 66 of the frame and tying it down with tension wires 65 to the three corners of the triangular base of the tetrahedron. While the mast 63 adds additional weight to the tetrahedron frame structure, it does give the vehicle the capability of using a jib 67 and mainsail 68 where the embodiments described above are primarily limited to a single sail (with or without boom). Once again, however, the tetrahedron structure gives the vehicle exceptional strength characteristics for the weight of the vehicle and thus substantially all of the aforementioned advantages also accrue to this embodiment of the invention.

What is claimed is:

1. In a surface travel vehicle propelled by the wind the combination comprising:
   a rigid frame defining a tetrahedron having a triangular base;
   a sail supported by said frame; and
   surface engaging transit means secured to said frame at the corners of the triangular base, whereby said frame is supported for effective translatory movement relative to the surface.

2. The vehicle of claim 1 wherein said surface engaging transit means are wheels.

3. The vehicle of claim 1 wherein said surface engaging transit means are ice skates.

4. The vehicle of claim 1 wherein said surface engaging transit means are buoyant members for transporting the vehicle in water.

5. The vehicle of claim 4 wherein each of said buoyant members has a hull which planes above a given speed whereby said member lifts out of the water above such speeds.

6. The vehicle of claim 5 wherein each of said buoyant members has a stabilizing fin associated therewith, wherein said fins protrude into the water.

7. The vehicle of claim 6 wherein each of said stabilizing fins has a hydrofoil attached thereto.

8. The vehicle of claim 6 wherein at least two of said stabilizing fins are pivotally mounted to their associated buoyant member whereby said vehicle can be navigated.

9. The vehicle of claim 8 further comprising a steering member secured to two of said movable stabilizing fins whereby both of said fins can be moved at the same time from a single location.

10. The vehicle of claim 6 wherein said stabilizing fins are all pivotally mounted to their associated buoyant members for steering purposes.

11. The vehicle of claim 1 wherein said sail is secured directly to the frame whereby the vehicle includes a mast which is an integral part of said vehicle frame.

12. The vehicle of claim 1 further comprising a mast secured to the apex of said frame, said sail being rigged to said mast.

13. The vehicle of claim 1 further comprising seat means secured to two sides of said base and extending parallel to the third side of said base.

14. The vehicle of claim 1 wherein said frame is formed by tubular members secured together and defining the edges of a tetrahedron.

15. The vehicle of claim 14 further comprising a webbing capable of supporting at least one person disposed within the area defined by the base of said frame and secured to the base defining members.

16. The vehicle of claim 14 further comprising connecting means securing some of said frame forming tubular members at the apex of the tetrahedron defined thereby, said connecting means including pivotal connectors whereby said tubular members joined by said connecting means can be disposed parallel to one another without being separated.

References Cited

UNITED STATES PATENTS

| 2,804,038 | 8/1957 | Barkla | 114—61 X |
| 3,191,569 | 6/1965 | Coombe | 114—39 X |
| 3,286,286 | 11/1966 | Nelson | 9—1 |

MILTON BUCHLER, *Primary Examiner.*

TRYGVE M. BLIX, *Assistant Examiner.*